US010872603B2

(12) United States Patent
Iwasa et al.

(10) Patent No.: US 10,872,603 B2
(45) Date of Patent: Dec. 22, 2020

(54) DIALOG DEVICE AND DIALOG METHOD

(71) Applicant: DENSO CORPORATION, Kariya (JP)

(72) Inventors: Takuya Iwasa, Kariya (JP); Toru Nada, Kariya (JP); Makoto Manabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 15/744,435

(22) PCT Filed: Sep. 23, 2016

(86) PCT No.: PCT/JP2016/077975
§ 371 (c)(1),
(2) Date: Jan. 12, 2018

(87) PCT Pub. No.: WO2017/057173
PCT Pub. Date: Apr. 6, 2017

(65) Prior Publication Data
US 2018/0204573 A1 Jul. 19, 2018

(30) Foreign Application Priority Data
Sep. 28, 2015 (JP) .................. 2015-189977

(51) Int. Cl.
G10L 15/22 (2006.01)
G10L 13/00 (2006.01)
(Continued)

(52) U.S. Cl.
CPC ............. *G10L 15/22* (2013.01); *G10L 13/00* (2013.01); *G10L 15/30* (2013.01); *G06F 40/20* (2020.01); *G10L 2015/223* (2013.01)

(58) Field of Classification Search
CPC ... G10L 15/22; G10L 15/30; G10L 2015/223; G10L 2015/228; G10L 2015/088;
(Continued)

(56) References Cited

U.S. PATENT DOCUMENTS 7,881,934 B2 *  2/2011  Endo ................. G10L 17/26
                                              704/251
2001/0021909 A1  9/2001  Shimomura et al.
(Continued)

FOREIGN PATENT DOCUMENTS

JP  2001188784 A  7/2001
JP  2004070876 A  3/2004
(Continued)

Primary Examiner — Duc Nguyen
Assistant Examiner — Alexander L Eljaiek
(74) Attorney, Agent, or Firm — Harness, Dickey & Pierce, P.L.C.

(57) ABSTRACT

A dialog device for executing a conversation with a user using a conversational sentence generated from content information is provided. The dialog device includes an information acquisition unit that acquires the content information from an information source, and changes the content information used in generation of the conversational sentence, and continues the conversation with the user. The dialog device sets multiple attribute information pieces with respect to specific content information used in generation of the conversational sentence. The dialog device controls the information acquisition unit to acquire other content information, having at least a part of attribute information pieces equal to the specific content information, as a candidate used in generation of the conversational sentence next to the specific content information.

19 Claims, 8 Drawing Sheets

(51) Int. Cl.
*G10L 15/30* (2013.01)
*G06F 40/20* (2020.01)

(58) Field of Classification Search
CPC ....... G10L 13/043; G10L 13/00; G10L 13/02;
G10L 13/04; G10L 15/08; G10L 15/1815;
G10L 15/1822; G10L 15/265; G06F
16/3329; G06F 16/337; G06F 16/35;
G06F 16/90332; G06F 16/9535; G06F
17/27; G06F 17/2775; G06F 17/278;
G06F 17/2785; G06F 17/28; G01C 21/36;
G06K 9/00845; G06N 5/025
USPC ....... 379/202.01; 700/94; 704/275, E15.001,
704/E15.04, E21.019, 231, 251, 257, 258,
704/270, 270.1, 271; 707/E17.068,
707/999.107; 709/202, 204; 715/701,
715/716, 730, 733
See application file for complete search history.

(56) References Cited

U.S. PATENT DOCUMENTS

| | | | |
|---|---|---|---|
| 2005/0278180 A1* | 12/2005 | O'Neill | G10L 15/1822 704/275 |
| 2006/0155765 A1 | 7/2006 | Takeuchi et al. | |
| 2007/0033040 A1* | 2/2007 | Huang | G06F 17/2755 704/254 |
| 2014/0379818 A1* | 12/2014 | Cudak | H04L 51/16 709/206 |
| 2016/0342683 A1* | 11/2016 | Lim | G06F 17/2775 |

FOREIGN PATENT DOCUMENTS

| | | |
|---|---|---|
| JP | 2006171719 A | 6/2006 |
| JP | 2009037458 A | 2/2009 |
| JP | 2010224623 A | 10/2010 |

* cited by examiner

FIG. 4

| | | NEWS 1 | NEWS 2 | NEWS 3 |
|---|---|---|---|---|
| THREAD | KEYWORD | PLAYER ND → | PLAYER AM → | TEAM RB |
| | CATEGORY BROAD CLASSIFICATION | SPORT | SPORT | SPORT |
| | DETAIL | TENNIS | TENNIS → | F1 |
| | DATE | DAY BEFORE | DAY BEFORE | DAY BEFORE |
| | PLACE | ENGLAND | ENGLAND → | SPAIN |
| | ORIGINAL SOURCE | SITE A | SITE A → | SITE B |

DIALOG DEVICE AND DIALOG METHOD

CROSS REFERENCE TO RELATED APPLICATIONS

This application is a U.S. National Phase Application under 35 U.S.C. 371 of International Application No. PCT/JP2016/077975 filed on Sep. 23, 2016 and published in Japanese as WO 2017/057173 A1 on Apr. 6, 2017. This application is based on and claims the benefit of priority from Japanese Patent Application No. 2015-189977 filed on Sep. 28, 2015. The entire disclosures of all of the above applications are incorporated herein by reference.

TECHNICAL FIELD

The present disclosure relates to a dialog device and a dialog method for performing conversation with a user.

BACKGROUND ART

As a kind of dialog device, Patent Literature 1 discloses, for example a response system capable of acquiring information, such as news, from an information source on the Internet. The response system acquires the latest news information from the Internet, in response to a question from the user such as "Is there any latest news?", and generates a response sentence to be uttered to the user by using the acquired news information.

PRIOR ART LITERATURES

Patent Literature

Patent Literature 1: JP-2009-37458-A

SUMMARY

The present inventors have made a great deal of consideration of a dialog device capable of developing a relatively long conversation, such as a chat, with the user, rather than a dialog device that responds to a single question such as the response system of Patent Literature 1. In the consideration process, the present inventors have thought of a configuration to continue a conversation with the user while changing information, such as news, for use in generation of a conversational sentence.

However, when the information, such as news, for use in generation of the conversational sentence is changed without discretion in the continuous conversation with the user, the linkage becomes weak between the conversational sentence generated from the news information before the change and the conversational sentence generated from the news information after the change. This might make the user feel artificiality in the conversational sentence generated by the dialog device.

It is an object of the present disclosure to provide a dialog device and a dialog method capable of generating a conversational sentence in which the user hardly feels artificiality even in a configuration where information for use in the conversational sentence is changeable so as to make a continuous conversation with the user.

According to an aspect of the present disclosure, a dialog device that executes a conversation with a user using a conversational sentence generated from content information, includes: an information acquisition unit that acquires the content information from an information source; a conversation execution unit that changes the content information used in generation of the conversational sentence, and continues the conversation with the user; an attribute setting unit that sets a plurality of attribute information pieces with respect to specific content information used in generation of the conversational sentence in the conversation execution unit; and an acquisition control unit that controls the information acquisition unit to acquire other content information, having at least a part of attribute information pieces equal to a part of the attribute information pieces of the specific content information, as a candidate used in generation of the conversational sentence next to the specific content information.

According to this dialog device, at least the part of the pieces of the attribute information in the specific content information can be the same as that in the other content information that is used in the conversational sentence following the specific content information. Hence, the linkage can be ensured between the conversational sentences generated from the pieces of content information. According to the above, even in a configuration where the content information for use in the conversational sentence is changeable so as to make a continuous conversation with the user, the dialog device can generate a conversational sentence in which the user hardly feels artificiality.

According to an aspect of the present disclosure, a dialog method for acquiring content information from an information source via an information acquisition unit and executes a conversation with a user using a conversational sentence generated from the content information, the dialog method includes: as steps to be executed by at least one processor, a conversation execution step of changing the content information used in generation of the conversational sentence, and continuing the conversation with the user; an attribute setting step of setting a plurality of attribute information pieces with respect to specific content information used in generation of the conversational sentence in the conversation execution step; and an acquisition control step of controlling the information acquisition unit to acquire other content information, having at least a part of attribute information pieces equal to a part of the attribute information pieces in the specific content information, as a candidate used in generation of the conversational sentence next to the specific content information.

Also in the above dialog method, the linkage can be ensured between the conversational sentences generated from the pieces of content information before and after the change, and hence it is possible to generate a conversational sentence in which the user hardly feels artificiality. Moreover, according to another aspect of the present disclosure, there is provided a program for causing at least one processor to execute the above-described dialog method. This program also exerts the above-described effect. Note that the program may be provided via an electrical communication line, or may be provided as stored in a non-transitory storage medium.

BRIEF DESCRIPTION OF DRAWINGS

The above and other objects, features and advantages of the present disclosure will become more apparent from the following detailed description made with reference to the accompanying drawings. In the drawings:

FIG. 4 is a diagram explaining transition of changes in attribute information with changes in content information, and is a diagram obtained by making a list of a plurality of threads that are defined with respect to the content information;

EMBODIMENTS FOR CARRYING OUT INVENTION

Figure 1:
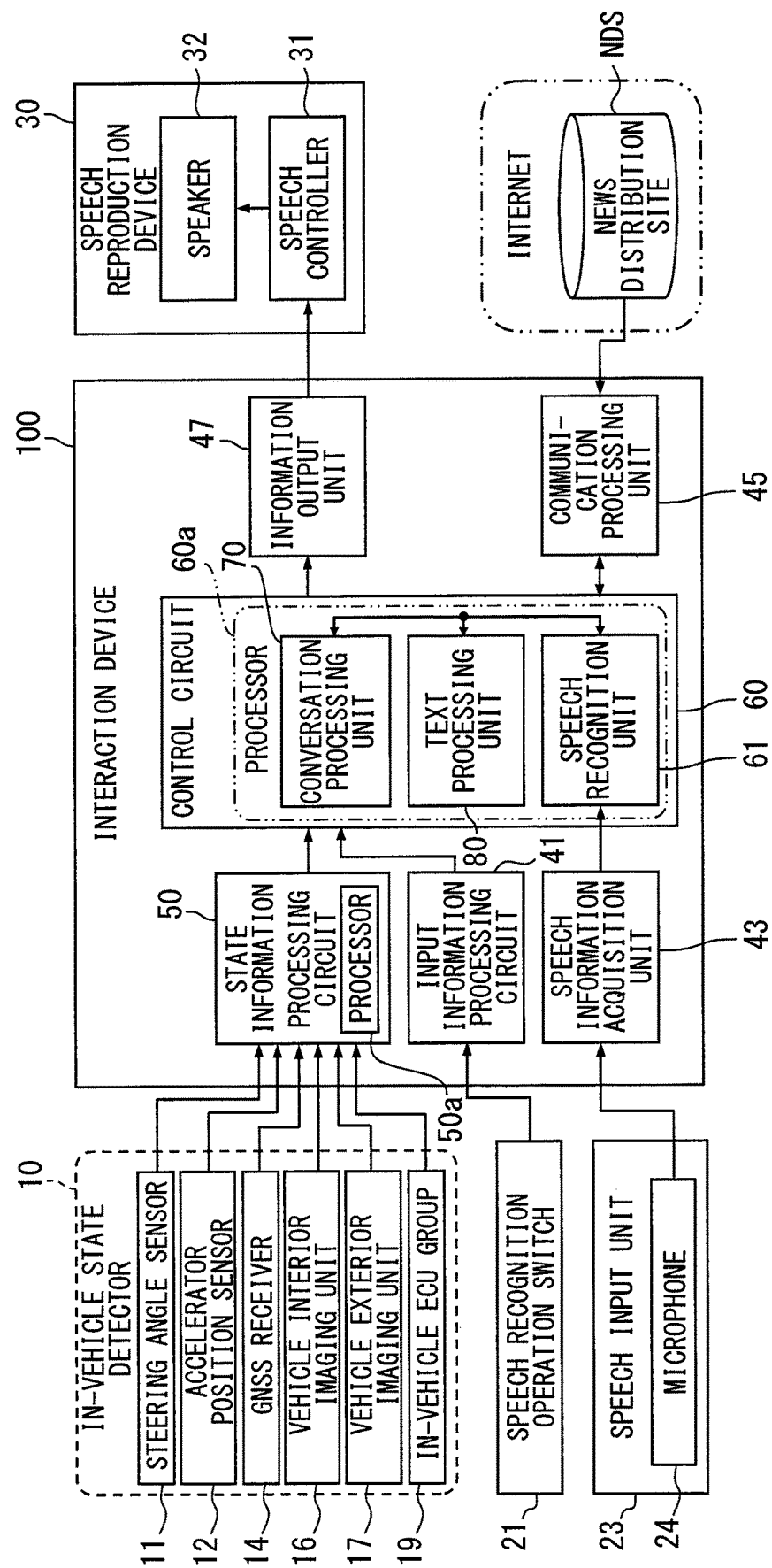
FIG. 1 is a block diagram showing an overall configuration of a dialog device according to an embodiment.
Figure 2:
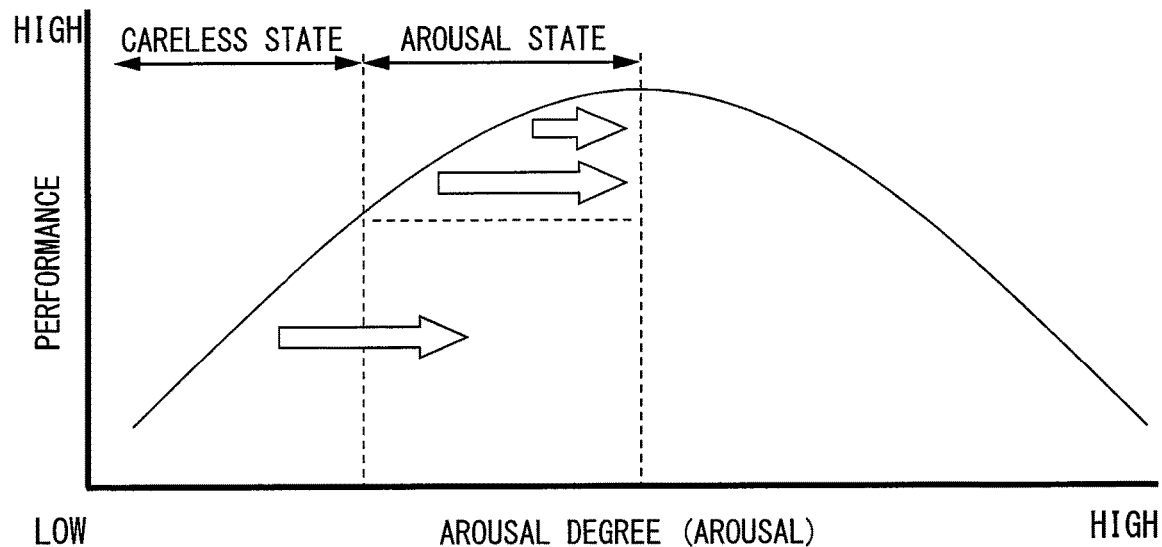
FIG. 2 is a diagram schematically showing the Yerkes-Dodson Law that explains a correlation between an arousal and driving performance of a driver.

A dialog device 100 according to one embodiment shown in FIG. 1 is mounted in a vehicle and capable of having a conversation with a passenger of the vehicle, which is a user. The dialog device 100 is actively interactable mainly with a driver among passengers of the vehicle. As shown in FIG. 2, the dialog device 100 has a conversation with the driver so as to hold the driver in a normal arousal state where the driver can show high driving performance. Further, the dialog device 100 can play a role of bringing the arousal of the driver who having entered a careless state and the driver beginning to enter a drowsy state back into the normal arousal state, by the conversation with the driver.

As shown in FIG. 1, the dialog device 100 is electrically connected with an in-vehicle state detector 10, a speech recognition operation switch 21, a speech input unit 23, and a speech reproduction device 30. Moreover, the dialog device 100 is connected to the Internet, and can acquire information from the outside of the vehicle through the Internet.

The in-vehicle state detector 10 is a variety of sensors and electronic equipment mounted in the vehicle. The in-vehicle state detector 10 includes at least a steering angle sensor 11, an accelerator position sensor 12, a GNSS (Global Navigation Satellite System) receptor 14, a vehicle interior imaging unit 16, a vehicle exterior imaging unit 17, and an in-vehicle ECU (Electronic Control Unit) group 19.

The steering angle sensor 11 detects a steering angle of a steering wheel steered by the driver and outputs a detection result to the dialog device 100. The accelerator position sensor 12 detects an amount of pressing an accelerator pedal by the driver and outputs a detection result to the dialog device 100.

The GNSS receptor 14 receives a positioning signal transmitted from a plurality of positioning satellites to acquire position information showing the current position of the vehicle. The GNSS receptor 14 outputs the acquired position information to the dialog device 100, a navigation ECU (described later), and the like.

The vehicle interior imaging unit 16 includes, for example, a near-infrared camera combined with a near-infrared light source. The near-infrared camera is installed in the vehicle interior and mainly shoots the driver's face by light applied from the near-infrared light source. By performing image analysis, the vehicle interior imaging unit 16 extracts from the shot image a direction of a visual line of the driver's eyes, opening conditions of the eyes (eyelids), and the like. The vehicle interior imaging unit 16 outputs information of the extracted direction of the driver's visual line, the extracted opening conditions of the eyes, and the like to the dialog device 100. By including a plurality of near-infrared cameras, visible light cameras, and the like, the vehicle interior imaging unit 16 can shoot, for example, a range other than the driver's face and detect movement of the driver's hands and body.

The vehicle exterior imaging unit 17 is a visible light camera installed inside or outside the vehicle in a posture facing the surroundings of the vehicle, for example. The vehicle exterior imaging unit 17 shoots the surroundings of the vehicle which include at least the front of the vehicle. By performing image analysis, the vehicle exterior imaging unit 17 extracts a road shape in the traveling direction, road congestion conditions around the vehicle, and some other information from the shot images. The vehicle exterior imaging unit 17 outputs information showing the road shape, the congestion conditions, and the like to the dialog device 100. The vehicle exterior imaging unit 17 may include a plurality of visible light cameras, near-infrared cameras, distance image cameras, and the like.

The in-vehicle ECU group 19 includes ECUs each mainly made up of a microcomputer, and includes an integrated control ECU, a navigation ECU, and the like. For example, fellow passenger's information is outputted from the integrated control ECU in an acquirable manner by the dialog device 100, the information showing whether passengers are seated on the passenger seat and the rear seat. From the navigation ECU, for example, information showing a road shape around the vehicle, or some other information, is outputted.

The speech recognition operation switch 21 is provided around the driver's seat. The passenger of the vehicle inputs, into the speech recognition operation switch 21, an operation for switching activation of a conversation function of the dialog device 100 between on and off. The speech recognition operation switch 21 outputs operation information, inputted by the passenger, to the dialog device 100. An operation of changing a set value concerning the conversation function of the dialog device 100 may be made inputable into the speech recognition operation switch 21.

The speech input unit 23 includes a microphone 24 provided in the vehicle interior. The microphone 24 converts speech of a conversation uttered by the passenger of the vehicle into an electrical signal and outputs the converted signal as speech information to the dialog device 100. The microphone 24 may be configured for a phone call, being provided in communication equipment such as a smartphone or a tablet terminal. Further, speech data collected by the microphone 24 may be wirelessly transmitted to the dialog device 100.

The speech reproduction device 30 is a device having an output interface function of outputting information to the passenger. The speech reproduction device 30 includes a display unit, a speech controller 31, and a speaker 32. When the speech controller 31 acquires speech data of conversational sentences, the speech controller drives the speaker 32 on the basis of the acquired speech data. The speaker 32 is provided in the vehicle interior, and outputs speech in the vehicle interior. The speaker 32 reproduces conversational sentences such that the passengers including the driver in the vehicle can listen to the sentences.

The speech reproduction device 30 may be simple acoustic equipment, or may be a communication robot installed on the upper surface of an instrument panel, or the like. The communication equipment such as the smartphone or the tablet terminal connected to the dialog device 100 may serve as the speech reproduction device 30.

Next, the configuration of the dialog device 100 will be described. The dialog device 100 is made up of an input information acquisition unit 41, a speech information acquisition unit 43, a communication processing unit 45, an information output unit 47, a state information processing circuit 50, a control circuit 60, and the like.

The input information acquisition unit 41 is connected with the speech recognition operation switch 21. The input information acquisition unit 41 acquires operation information outputted from the speech recognition operation switch 21 and provides the acquired operation information to the control circuit 60. The speech information acquisition unit 43 is an interface for inputting speech, connected with the microphone 24. The speech information acquisition unit 43 acquires speech information outputted from the microphone 24 and provides the acquired speech information to the control circuit 60.

The communication processing unit 45 includes an antenna for mobile communication. The communication processing unit 45 transmits and receives information to and from a base station outside the vehicle via the antenna. The communication processing unit 45 is connectable to the Internet through the base station. The communication processing unit 45 can acquire a variety of pieces of content information through the Internet. Examples of the pieces of content information include news information, column article information, blog article information, traffic information such as traffic jam information showing congestion conditions around the current position where the vehicle is traveling, and regional information such as popular spots, events, and a weather forecast around the current point. The content information is acquired from at least one or more news distribution sites NDS on the Internet, for example.

The information output unit 47 is an interface that is connected with the speech reproduction device 30 and that outputs speech. The information output unit 47 outputs speech data, generated by the control circuit 60, to the speech reproduction device 30. The speech data outputted from the information output unit 47 is acquired by the speech controller 31 and reproduced by the speaker 32.

The state information processing circuit 50 acquires information outputted from the in-vehicle state detector 10 to mainly estimate the driver's state. The state information processing circuit 50 is mainly made up of a microcomputer including a processor 50a, a RAM, and a flash memory. The state information processing circuit 50 is provided with a plurality of input interfaces that receive signals from the in-vehicle state detector 10. The state information processing circuit 50 can achieve a burden determination function and an arousal state determination function, by the processor 50a executing a predetermined program.

The burden determination function is a function that determines whether the driving burden on the driver is high on the road where the vehicle is currently driving. The state information processing circuit 50 acquires detection results outputted from the steering angle sensor 11 and the accelerator position sensor 12 When the state information processing circuit 50 estimates that the driver is busily operating at least one of the steering and the accelerator pedal based on transition of the acquired detection results, the burden determination block 51 determines that the current driving burden is high.

Further, the state information processing circuit 50 acquires shape information of the road where the vehicle is traveling, traffic information showing congestion conditions around the vehicle, and some other information. The shape information of the road can be acquired from the vehicle exterior imaging unit 17 and the navigation ECU. The traffic information can be acquired from the vehicle exterior imaging unit 17 and the communication processing unit 45. When the road in the traveling direction has a curved shape and when the vehicle is estimated to be traveling in a traffic jam, the state information processing circuit 50 determines that the current driving burden is high.

On the other hand, when the vehicle is traveling on mostly a linear road and few other traveling vehicles and pedestrians are around the vehicle, the state information processing circuit 50 determines that the current driving burden is low. Also when the operating amounts of the steering and the accelerator pedal fluctuate slightly, the state information processing circuit 50 can determine that the driving burden is low.

The arousal state determination function determines whether the driver is in the careless state or the drowsy state. When the state information processing circuit 50 detects a careless operation on the steering or the accelerator pedal, an occasionally inputted large correction operation, or the like based on transition of the detection results acquired from each of the sensors 11, 12, the arousal state determination function determines that the driver is in the careless state or the drowsy state.

Further, the state information processing circuit 50 acquires, from the vehicle interior imaging unit 16, information such as a direction of a visual line of the driver's eyes and opening conditions of the eyes. When the parallax of the eyes is unstable or is not in an appropriate state for perception of an object in the traveling direction, and when the opening degree of the eyes continues to be low, the arousal state determination function determines that the driver is in the careless state or the drowsy state.

Figure 3:
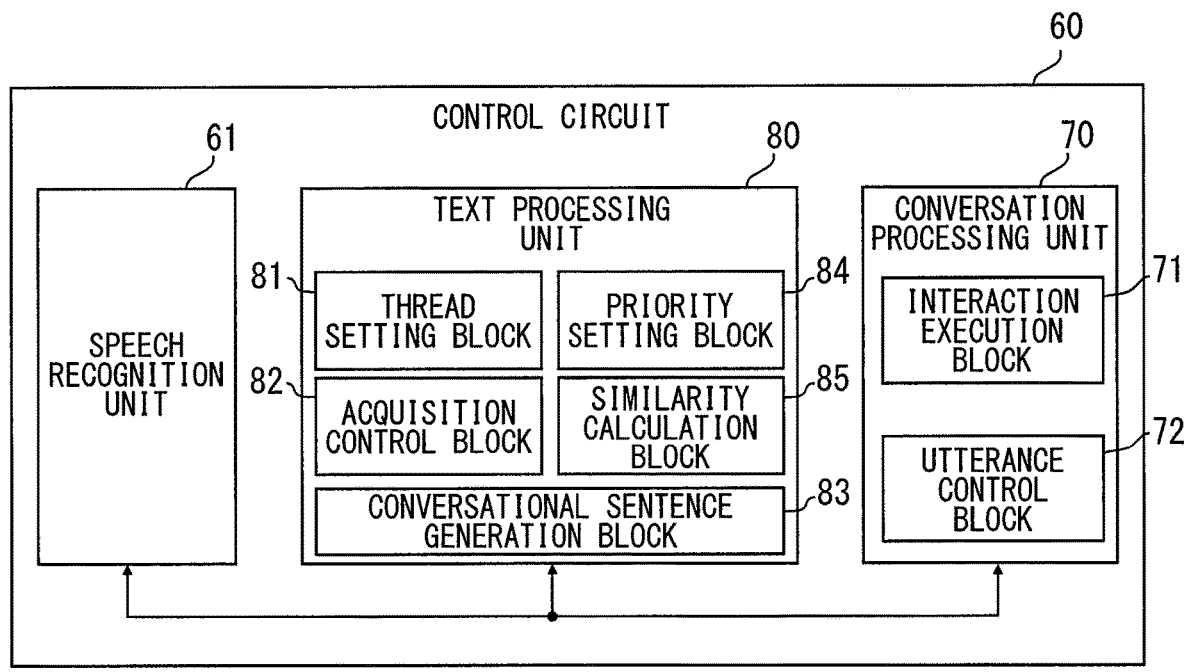
FIG. 3 is a diagram explaining functional blocks and sub blocks constructed in a control circuit.

The control circuit 60 is a circuit that integrally controls a conversation exchanged with the user. The control circuit 60 is mainly made up of a microcomputer including a processor 60a, a RAM, and a flash memory. The control circuit 60 is provided with an input/output interface connected with other configurations of the dialog device 100. The control circuit 60 constructs, as functional blocks, a speech recognizer 61, a text processing unit 80, and a conversation processing unit 70, as shown in FIG. 3, by the processor 60a executing a predetermined program. Hereinafter, a detail of each functional block constructed in the control circuit 60 will be described based on FIGS. 1 and 3.

The speech recognizer 61 acquires a content of the user's utterance. The speech recognizer 61 is connected with the speech information acquisition unit 43 and acquires speech data from the speech information acquisition unit 43. The speech recognizer 61 reads the acquired speech data and converts the read data to text data. The speech recognizer 61 converts, into text data, words uttered by the passengers including the driver in the vehicle interior, such as the user's question thrown at the dialog device 100, the user's monologue, and a conversation between the users. The speech recognizer 61 then provides the text data to the text processing unit 80.

The text processing unit 80 acquires content information through the communication processing unit 45 and generates a conversational sentence for use in a conversation with the user by using the acquired content information. The text processing unit 80 can acquire from the speech recognizer 61 a content of the user's utterance converted into the text data, to generate a conversational sentence of content corresponding to the utterance of the user. The text processing unit 80 includes, as sub blocks, a thread setting block 81, an acquisition control block 82, a priority setting block 84, and a similarity calculation block 85, along with a conversational sentence generation block 83 that generates a conversational sentence from the content information. In the following description, the content information for use in generation of the conversational sentence in the conversational sentence generation block 83 is referred to as "specific content information."

The thread setting block 81 defines a plurality of threads with respect to the specific content information. Items taken as the threads are a keyword, category broad classification, a category detail, a date, a place, a news distribution site NDS to be an original source of the content information, and the like (cf. FIG. 4). The thread setting block 81 sets attribute information corresponding to a content, a history, and the like of the content information in each of the plurality of threads. For example, in the thread for the keyword, there are set, as attribute information, important words in the news information such as proper names that appears in a news, such as a person's name, a corporate name, a name of a place, a name of an event, a name of an article, and a name of a facility. In the category broad classification, pieces of attribute information such as sports, economics, politics, and entertainment are set. The attribute information may be set by analyzing a title and a main text of the content information, or may be set based on tag information added in the news distribution site NDS. As a method of analyzing the main text to set the attribute information, there is, for example, a method of using a morphological analysis and proper representation obtained by proper representation extraction. Alternatively, a tfidf (term frequency-inverse document frequency) value may be calculated for each word in the sentence, and a word with a high score may be extracted.

The acquisition control block 82 controls acquisition of the content information by the communication processing unit 45. The acquisition control block 82 causes the communication processing unit 45 to acquire other content information as a candidate to be used in the conversational sentence following the specific content information. The acquisition control block 82 causes the communication processing unit 45 to search the other content information with at least part of pieces of attribute information being the same as that in the specific content information and part of pieces of the attribute information being different from that in the specific content information.

Specifically, the acquisition control block 82 specifies a fixed thread that fixes the attribute information among the plurality of threads. Among the plurality of threads, the other threads not specified as the fixed thread become transit threads in which the attribute information changes. The acquisition control block 82 causes the communication processing unit 45 to acquire other content information relating to the attribute information stored in the fixed thread.

In every acquisition of the content information as the candidate that is used next in the conversational sentence, the acquisition control block 82 can change the thread that is specified as the fixed thread. Further, the acquisition control block 82 can change the number of threads to be specified as the fixed threads. When the user shows an interest in the conversation based on the specific content information, the acquisition control block 82 sets a large number of fixed threads. On the other hand, when the user shows little interest in the conversation, the acquisition control block 82 sets a small number of fixed threads.

Moreover, the acquisition control block 82 analyzes the content of the user's utterance acquired through the speech recognizer 61, to extract a word relating to each piece of the attribute information set with respect to the specific content information. When the word relating to the attribute information is extracted from the user's utterance, the acquisition control block 82 can use the extracted word as a search word at the time of acquiring other content information, along with the attribute information in the fixed thread. As a result, the acquisition control block 82 can cause the communication processing unit 45 to acquire other content information having the linkage with the specific content information in terms of the content and having a high probability of attracting the user's interest.

The priority setting block 84 sets a priority order of the thread selected by the fixed thread. The thread with a high priority order, set in the priority setting block 84, is specified as the fixed thread in the acquisition control block 82. The priority setting block 84 can adjust the priority order of the thread based on a history of the user's utterance, acquired in the speech recognizer 61.

Figure 7:
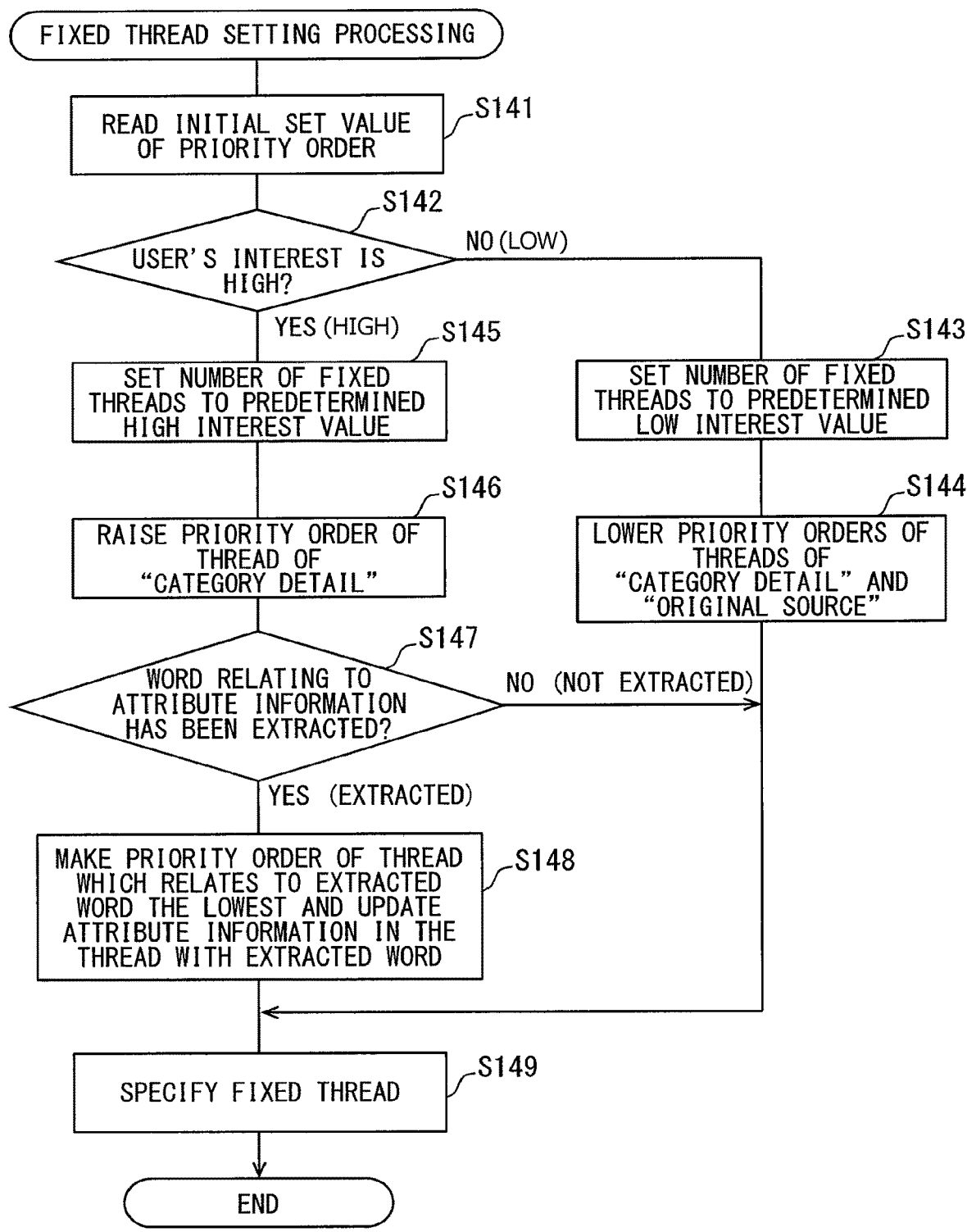
FIG. 7 is a flowchart showing fixed thread setting processing performed in the control circuit.

For example, when a word relating to the attribute information is extracted from the content of the user's utterance, the priority setting block 84 lowers the priority order of the thread relating to the extracted word, to allow updating of the attribute information based on the extracted word (cf. FIG. 7, S148). When the user shows an interest in the conversation based on the specific content information, the priority setting block 84 adjusts the thread for the category detail by raising the priority order thereof (cf. FIG. 7, S146).

As a result, the thread for the category detail is more likely to be specified as the fixed thread, and hence the topic interesting for the user is continued. On the other hand, when the user is little interested in the conversation, the priority setting block 84 adjusts the threads for the category detail and the original source by lowering the priority orders thereof (cf. FIG. 7, S144). This allows a change in the topic of the conversation. Techniques for extracting the user's interest include a technique in which a dictionary having calculated positive and negative values of words is prepared, and a degree of interest is calculated from the degree of interest from the positiveness level of the user's utterance, obtained by comparing the content of the user's utterance with the dictionary. Alternatively, the degree of the user's interest may be decided in cooperation with an expression rating function by using the camera. It is also possible to acquire a high interest by estimating the kind of utterance from morpheme information of the user's utterance, and creating such a rule that the user is not interested when continuing to give responses.

Figure 8:
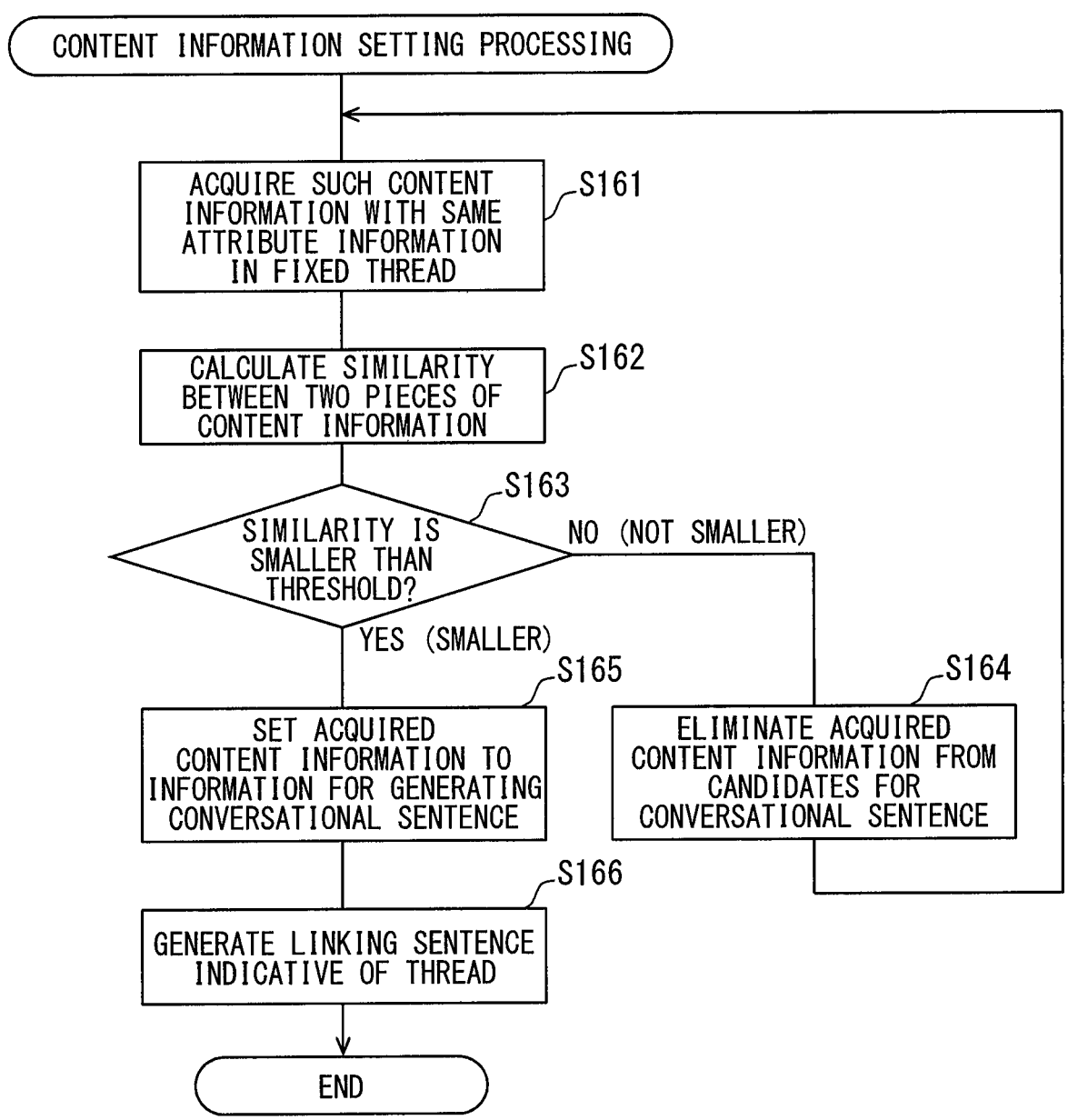
FIG. 8 is a flowchart showing content information setting processing performed in the control circuit.

The similarity calculation block 85 calculates a similarity between the specific content information and content information acquired as the candidate for use in generation of the next conversational sentence (FIG. 8, S162). The similarity calculation block 85 compares characteristic words contained in the pieces of content information to calculate the similarity. As a method for acquiring the characteristic word contained in the content information, there is, for example, a method of using a morphological analysis and proper representation obtained by proper representation extraction. Alternatively, a tfidf value may be calculated for each word in the sentence and a word with a high score may be extracted. The similarity can be calculated using 2-gram value previously calculated from a great amount of text data. The similarity may also be calculated using word2vec. The acquisition control block 82 eliminates content information, where the similarity calculated in the similarity calculation block 85 is higher than a previously set threshold, from the candidates for use in the conversational sentence (cf. FIG. 8, S164). By the above processing, it is possible to avoid a situation where, for example, two pieces of content information provided from different news distribution sites NDS as the original sources but informing substantially the same events are successively employed in generation of the conversational sentence.

The conversational sentence generation block 83 can summarize the title of the content information and the content of the main text thereof, acquired by control of the acquisition control block 82, to generate a plurality of conversational sentences from one piece of content information. Each conversational sentence ends in such a form as to be felt natural as a spoken language, such as "right?" or "(It is . . . ,) isn't it?" When the user throws a question, the conversational sentence generation block 83 can recognize the user's utterance, acquired by the speech recognizer 61, to generate a conversational sentence responding to the user's question. The conversational sentence generation block 83 outputs text data of the generated conversational sentences to the conversation processing unit 70.

The conversational sentence generation block 83 can change the content information for use in generation of the conversational sentence so as to continue the conversation with the user. When changing the content information for use in generation of the conversational sentence, the conversational sentence generation block 83 inserts a linking sentence at the opening of the first conversational sentence generated from the content information after the change. The linking sentence contains attribute information such as "Speaking of <keyword>, . . . " or "<Date> is . . . " When the topic of the conversation is continued, the conversational sentence generation block 83 inserts a linking sentence indicative of a transit thread with the attribute information changed. On the other hand, when the topic of the conversation is greatly changed, the conversational sentence generation block 83 inserts a linking sentence indicative of the fixed thread with the attribute information maintained.

The conversation processing unit 70 has a conversation with the user by using the conversational sentence generated by the text processing unit 80. The conversation processing unit 70 includes a dialog execution block 71 and an utterance control block 72 as sub blocks for controlling the conversation with the user.

The dialog execution block 71 acquires the text data of conversational sentences generated by the conversational sentence generation block 83 to synthesize speech data of the acquired conversational sentence. The dialog execution block 71 may perform syllable connection-type speech synthesis, or may perform corpus base-type speech synthesis. Specifically, the dialog execution block 71 generates rhythm data at the time of utterance from the conversational sentence text data. The dialog execution block 71 then joins pieces of speech waveform data from previously stored speech waveform database in accordance with the rhythm data. From the above process, the dialog execution block 71 can convert the conversational sentence text data to the speech data. The dialog execution block 71 outputs the speech data of the conversational sentences from the information output unit 47 to the speech controller 31, to cause the speaker 32 to utter the conversational sentences.

The utterance control block 72 controls execution of a conversation by the dialog execution block 71. For example, when an instruction to bring the conversation function of the dialog device 100 into an off-state has been inputted by operation on the speech recognition operation switch 21, the utterance control block 72 brings the dialog execution block 71 into a stopped state.

Moreover, in accordance with burden determination made by the state information processing circuit 50, the utterance control block 72 switches an activation status of the dialog execution block 71 between a forbidden state and a permitted state. Specifically, when the burden determination function determines that the driving burden is high, the dialog execution block 71 sets the activation status of the dialog execution block 71 in the forbidden state in which the start of utterance is forbidden. On the other hand, when the burden determination function determines that the driving burden is low, the utterance control block 72 sets the activation status of the dialog execution block 71 in the permitted state in which the start of utterance is permitted.

Even when the burden determination function determines that the driving burden is low, the utterance control block 72 does not set the activation status of the dialog execution block 71 in the permitted state, but holds it in the forbidden state, in the case that a previously set forbidding condition has been satisfied. The forbidding condition can be set as appropriate. For example, the utterance control block 72 can make the forbidding condition satisfied when the fellow passenger's state estimation block 54 has determined that the passenger other than the driver is present based on the fellow passenger information outputted from the integrated ECU.

In the following, a description will be given of a conversation between the user and the dialog device 100, achieved by the control circuit 60 described so far. Although an existing proper name is naturally uttered in an actual conversation, the description of < . . . > as below will be given in the following description so as to avoid direct indication.

Dialog device: "Do you know a news titled '<Tennis Player ND> wins victory with outstanding clutch'?"

User: "I didn't know."

Dialog device: "It seems like <Tennis Player ND> won his fifth Australian Open title and his first in two year.

User: "Who was opponent in the final?"

Dialog device: "<Tennis Player AM> was." All semi-finalists seem to be the big four players.

User: "I wonder how defeated <Tennis player AM> feels."

By the user uttering the name of <Tennis Player AM>, the control circuit 60 estimates that the user shows a high interest in the conversation. In order to continue the current topic of the conversation, the control circuit 60 changes content information, used in generation of a conversational sentence, from news 1 to news 2 (cf. FIG. 4). In this case, only a thread of a keyword which can set such attribute information as <Tennis Player AM> is taken as the transit thread. Hence, a linking sentence indicative of the thread of the keyword is inserted into the opening of the next conversational sentence.

Dialog device: "Speaking of <Tennis Player AM>, <Tennis Player AM>, a runners-up, reportedly said "I shouldn't feel shame."

User: "Although he lost, he still took a second place."

Dialog device: "In the Australian Open, "<Tennis Player AM> lost to <Tennis Player RF> in the final of 2010 and lost to <Tennis Player ND> in the finals of 2011 and 2013. He said, "I want to get back here next year and expect a little different result in the final then.", and then got a round of applause from the audience."

User: "He has got to the final quite a lot, hasn't he?"

Dialog device: "Reportedly, <Tennis Player AM>, who had felt that he would also have a chance to win, looked back on the game, saying, "Apparently I also had a chance in the first three sets, but he won a clear victory in the fourth set. His returns from the base line are also marvelous."

User: "I see."

When the user gives a replay with a low interest, such as "I see" above, the control circuit 60 changes the content information for use in generation of a conversational sentence from News 2 to News 3 so as to change the topic of the conversation (cf. FIG. 4). In this case, a thread of the category broad classification and a thread of the date are taken as a fixed thread. Hence, a linking sentence indicative of the thread of the date is inserted into the opening of the next conversational sentence.

Dialog device: "Yesterday, there was also news of the F1 race, titled '<F1 team RB> made test travel of camouflaged new car?"

(The Conversation Will be Continued.)

Figure 5:
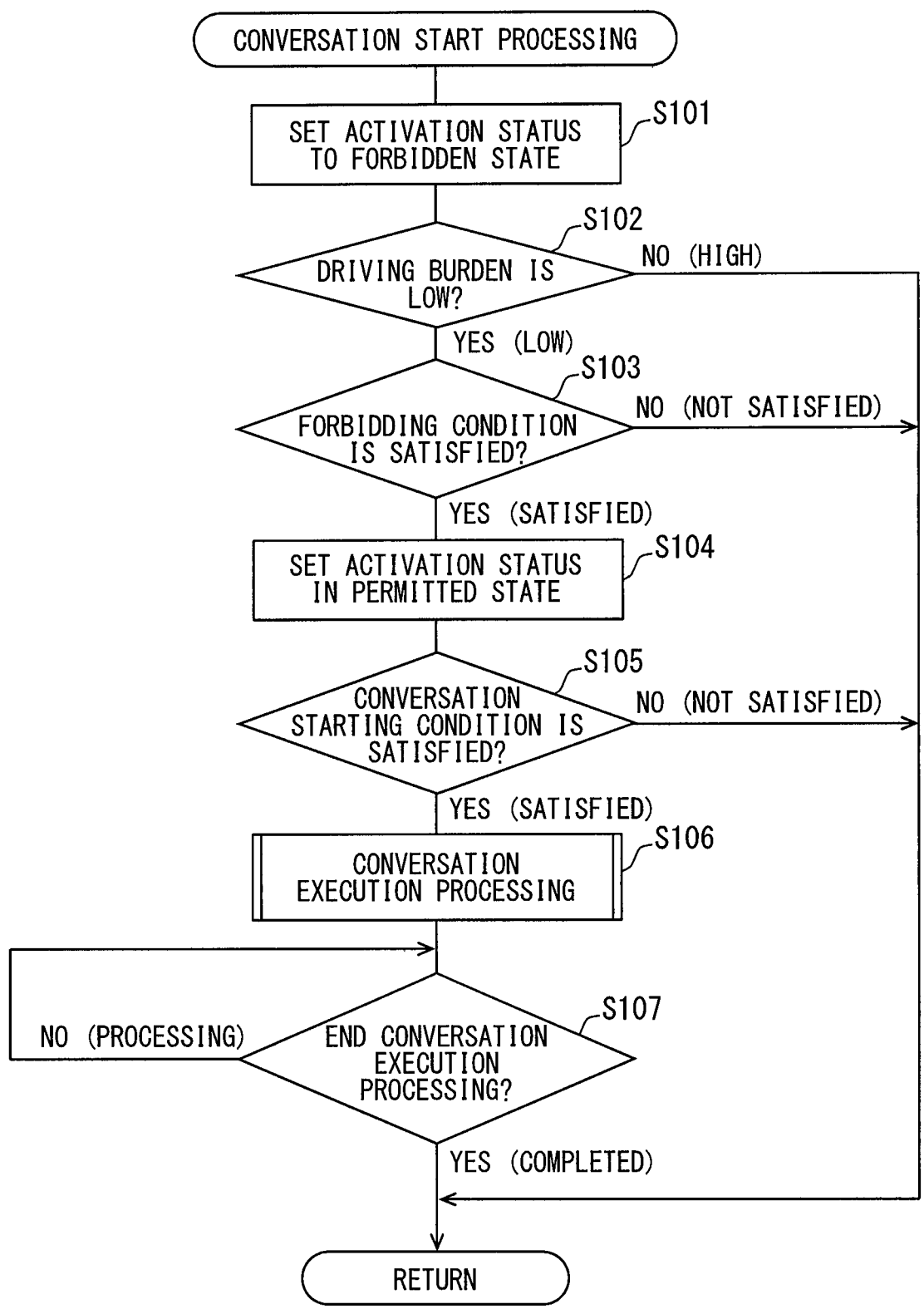
FIG. 5 is a flowchart showing conversation start processing performed in a control circuit.

A description will be given of a detail of each processing performed in the control circuit 60 in order to achieve such a continuous conversation as above. First, a detail of the conversation start processing will be described based on FIG. 5 with reference to FIG. 3. Each step of the conversation start processing shown in FIG. 5 is carried out mainly by the conversation processing unit 70. The conversation start processing is started based on that the power of the vehicle is brought into the on-state, and is repeatedly started until the power of the vehicle is brought into the off-state.

In S101, as an initial setting, the activation status of the dialog execution block 71 is set in the forbidden state, and the processing proceeds to S102. In S102, a determination result of burden determination made by the state information processing circuit 50 (FIG. 1) is acquired, to determine whether the current driving burden on the user is low. When it is determined that the current driving burden is high in S102, the processing proceeds to S107. On the other hand, when it is determined that the driving burden is low in S102, the processing proceeds to S103.

In S103, it is determined whether the forbidding condition has been satisfied. On the other hand, when it is determined that any forbidding condition has not been satisfied in S103, the processing proceeds to S104. In S104, the activation status of the dialog execution block 71 is switched from the forbidden state to the permitted state, and the processing proceeds to S105.

In S105, it is determined whether a conversation starting condition has been satisfied. Examples of the conversation starting condition include a condition as to whether the user is in the careless state or the drowsy state, and a condition as to whether there is such latest content information as to belong to the driver's preference category. When it is determined that the conversation starting condition has not been satisfied in S105, the conversation start processing is once ended. On the other hand, when it is determined that the conversation starting condition has been satisfied in S105, the processing proceeds to S106.

In S106, the conversation execution processing (cf. FIG. 6) as the sub routine of the conversation start processing is started, and the processing proceeds to S107. In S107, it is determined whether the conversation execution processing is being performed. When it is determined that the conversation execution processing still continues in S107, standby is kept until the conversation execution processing ends by repeating the determination of S107. When it is determined that the conversation execution processing has been completed, the conversation start processing is once ended.

Figure 6:
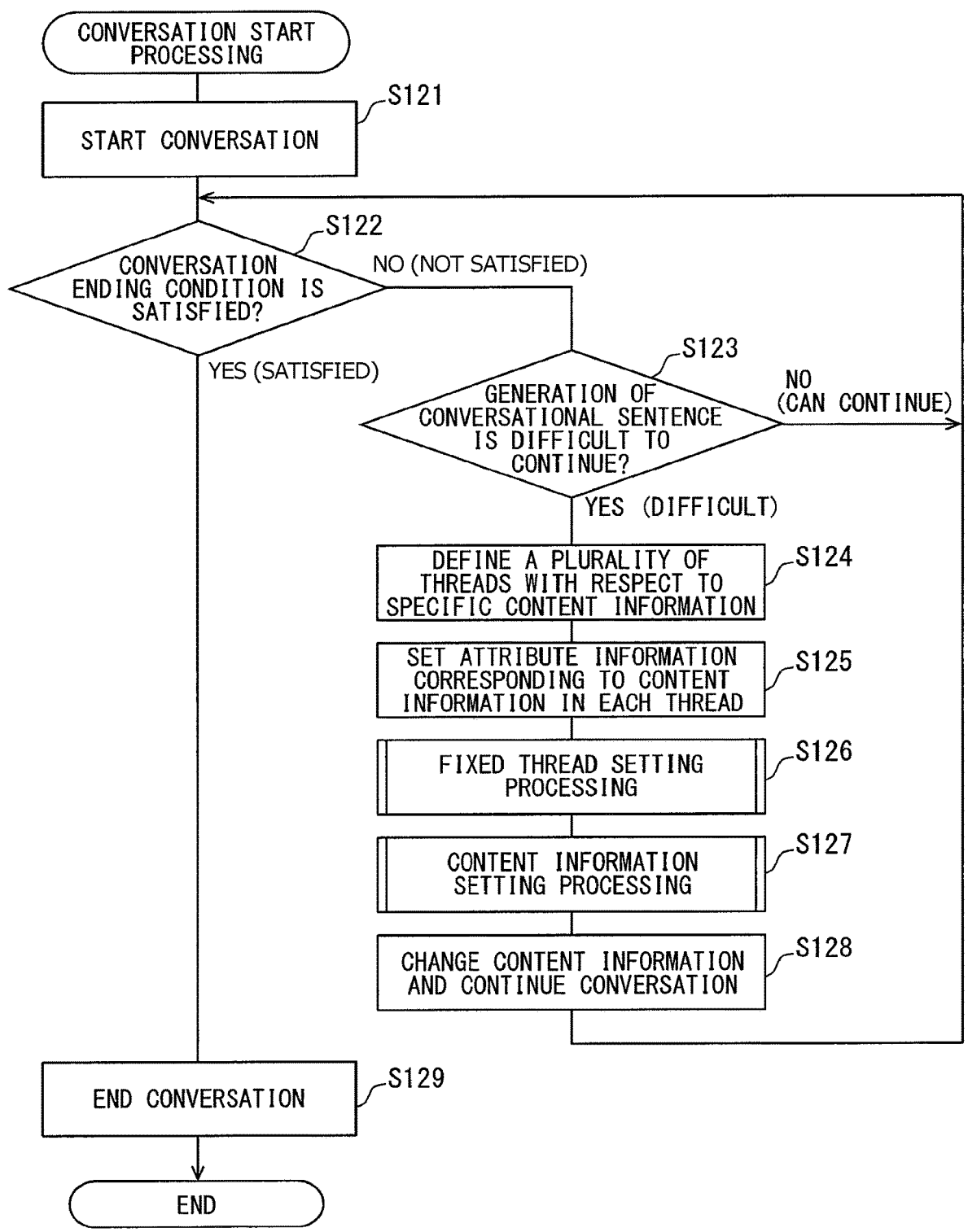
FIG. 6 is a flowchart showing conversation execution processing performed in the control circuit.

Next, a detail of the conversation execution processing started in S106 will be described based on FIG. 6 with reference to FIG. 3.

In S121, a conversation with the user is started, and the processing proceeds to S122. From S121, the dialog device 100 (cf. FIG. 1) speaks to the user with such a conversational sentence as "Do you know . . . ?" Such a conversation with the user as above is achieved by cooperation between the conversational sentence generation block 83 that generates a conversational sentence and the dialog execution block 71 that converts the generated conversational sentence into speech data.

In S122, it is determined whether a conversation ending condition has been satisfied. Examples of the conversation ending condition include a condition that the user has entered the arousal state, a condition that the user has uttered instructing to end the conversation, and a condition that the driving burden on the user has increased. When it is determined that the conversation ending condition has been satisfied in S122, the processing proceeds to S129, and the conversation started in S121 is ended. On the other hand, when it is determined that the conversation ending condition has not been satisfied in S122, the processing proceeds to S123.

In S123, it is determined whether the conversational sentence can be generated continuously from the current specific content information. When it is determined that the generation of the conversational sentence can be continued in S123, standby is kept until the continuation of the conversation becomes difficult by repeating the determination of S122 and S123. When almost all pieces of information contained in the content information are used as the conversational sentences and further generation of the conversational sentence becomes difficult, the processing proceeds to S124.

In S124, a plurality of threads is defined with respect to the specific content information, and the processing proceeds to S125. In S125, attribute information corresponding to the content information is stored into each thread, and the processing proceeds to S126. In S126, the fixed thread setting processing (cf. FIG. 7) as the sub routine is started, and the processing proceeds to S127.

In S127, the content information setting processing (cf. FIG. 8) as the sub routine is started, and the processing proceeds to S128. In S128, the content information for use in generation of the conversational sentence in the conversational sentence generation block 83 is changed to content information set in S127. Then, the conversation with the user is continued using the conversational sentence based on the new content information.

Next, a detail of the fixed thread setting processing started in S126 will be described based on FIG. 7 with reference to FIG. 3. According to the fixed thread setting processing, each of the plurality of threads is set to either the fixed thread or the transit thread. Each step of the fixed thread setting processing is mainly performed by each sub block of the text processing unit 80.

In S141, for setting the priority order of the thread selected as the fixed thread, an initial set value of the priority order is read, and the processing proceeds to S142. The initial set value may be an order set at random, or may be an order previously set by operation input by the user. Further, the initial set value may be set based on a history of conversations with the user.

In S142, from the content of the user's utterance acquired from the speech recognizer 61, it is estimated whether the user's interest is high in specific content information used in the latest conversation. Specifically, in S142, for example, when the user shows such a reaction as saying "I see" or "Hmm", or when there is no reaction from the user, it is determined that the user's interest is low. When it is determined that the user's interest is low in S142, the processing proceeds to S143.

In S143, a predetermined low interest value is set, which is obtained by previously setting the number of fixed threads, and the processing proceeds to S144. The predetermined low interest value is set to, for example, a value being more than half of the number of threads, so as to greatly change the topic of the conversation. The predetermined low interest value of the present embodiment is previously set to "4." In S144, adjustment is made to lower the priority orders of the threads of the category detail and the original source, and the processing proceeds to S149. The adjustment of the priority orders in S144 facilitates changing the attribute information stored in the thread of each of the category detail and the original source.

On the other hand, when it is determined that the user's interest is high in S142, the processing proceeds to S145. In S145, a predetermined high interest value is set, which is obtained by previously setting the number of fixed threads, and the processing proceeds to S146. The predetermined high interest value is set to, for example, a value being less than half of the number of threads, so as to continue the topic of the conversation. The predetermined high interest value of the present embodiment is previously set to "1." The predetermined high interest value is made smaller than the predetermined low interest value. In S146, adjustment is made to raise the priority order of the thread of the category detail, and the processing proceeds to S147.

In S147, it is determined whether a word relating to the attribute information set in S125 of the conversation execution processing (cf. FIG. 6) has been uttered by the user. When the word relating to the attribute information is not extracted from the user's utterance in S147, the processing proceeds to S149. On the other hand, when the word relating to the attribute information is extracted from the user's utterance in S147, the processing proceeds to S148. For example, when the name of <Tennis player ND> is set as the attribute information in the thread of the keyword, a name of another famous tennis player corresponds to the word relating to the attribute information (cf. FIG. 4).

In S148, the priority order of the thread relating to the extracted word is adjusted to the lowest, and the attribute information in the thread is updated with the extracted word. Specifically, when the user utters the name of <Tennis Player AM> as in the conversation described above, the priority order of the thread of the keyword is made the lowest, and the attribute information in the thread is updated from <Tennis player ND> to <Tennis Player AM> (cf. FIG. 4). In S149, the fixed thread is set based on the number of fixed threads set in S143 or S145 and the priority order set in S144 or S146 to 148.

Next, a detail of the content information setting processing started in S127 (cf. FIG. 6) will be described based on FIG. 8 with reference to FIG. 3. According to the content information setting processing, the content information that is used next in generation of the conversational sentence is set. Steps of the content information setting processing are mainly performed by sub blocks of the text processing unit 80, respectively.

In S161, such content information with attribute information in the fixed thread being the same as specified in S149 (FIG. 7) is acquired from the Internet, and the processing proceeds to S162. In S161 in a case where the word relating to the attribute information has been extracted from the user's utterance in the acquisition control block 82, content information also highly relating to the extracted word is obtained.

In S162, a similarity between the content information acquired in S161 and the latest specific content information is calculated, and the processing proceeds to S163. In S163, it is determined whether the similarity calculated in S162 is smaller than a previously set threshold. When the similarity is not smaller than the threshold in S163, the processing proceeds to S164. In S164, the content information acquired in immediately previous step of S161 is eliminated from the candidates for use in the conversational sentence, and the processing returns to S161. In S161 for the second time, content information is re-searched such that each piece of attribute information is the same.

On the other hand, when the similarity is smaller than the threshold in S163, the processing proceeds to S165. In S165, the content information acquired in immediately previous step of S161 is set to the content information that is used next in generation of the conversational sentence, and the processing proceeds to S166. In S166, a linking sentence indicative of a thread with its attribute information updated, or a thread with its attribute information maintained, is generated to end the content information setting processing.

According to present embodiment described so far, at least part of pieces of the attribute information in the specific content information can be the same as that in the other content information which is used in the conversational sentence following the specific content information. Hence, the linkage in terms of the content is ensured between the conversational sentences generated from a plurality of pieces of content information, such as News 1 to 3 (cf. FIG. 4) described above. According to the above, even in a configuration where the content information for use in the conversational sentence is changeable so as to make a continuous conversation with the user, the dialog device 100 can generate a conversational sentence in which the user hardly feels artificiality.

Further, every time the thread setting block 81 according to the present embodiment causes the communication processing unit 45 to acquire other content information for use in the next conversational sentence, the thread setting block 81 can change the fixed thread. As a result, the change in content information for use in the conversational sentence is repeated, leading to a gradual change in topic of the conversation. Hence the dialog device 100 can develop a natural conversation in which the topic changes gradually, with the user.

According to the present embodiment, the priority setting block 84 adjusts the priority order of the thread taken as the fixed thread, to thereby control the change in content of content information for use in the conversational sentence. The priority setting block 84 can adjust the priority order of the thread taken as the fixed thread based on the user's utterance history. According to the above, the dialog device 100 can change the content information in accordance with, for example, the user's reaction, to excite the conversation so as not to lose the user's interest.

According to the present embodiment, when changing the content information for use in generation of the conversational sentence, the conversational sentence generation block 83 inserts a linking sentence into the opening of the conversational sentence generated from the content information before the change. By indicating a thread with its attribute information updated or a thread with its attribute information maintained, the linking sentence can suggest the user the relation in terms of the content between the two pieces of content information before and after the change. As a result, even when the content information used for the conversational sentence is changed, the user hardly feels strange with the conversational sentence uttered from the dialog device 100.

Further, according to the present embodiment, based on the similarity calculated by the similarity calculation block 85, the acquisition control block 82 can eliminate other content information, which shows the same event as that of the specific content information, from the candidates for the next conversational sentence. According to the above, such a situation is avoided where the conversational sentence notifying the same event is successively generated, to lose the user's usage intention.

According to the present embodiment, when the user's interest in the topic being developed is high, the number of fixed threads is increased. This can result in reduction of the change in topic, thereby holding the state of the user's interest high. On the other hand, when the user's interest is low, the number of fixed threads is decreased. This can lead the dialog device 100 to greatly change the topic and provide fresh information, to attract the user's interest.

In the present embodiment, the communication processing unit 45 corresponds to the "information acquisition unit", the speech recognizer 61 corresponds to the "utter acquisition unit", and the dialog execution block 71 and the conversational sentence generation block 83 correspond to the "conversation execution unit." The thread setting block 81 corresponds to the "attribute setting unit", the acquisition control block 82 corresponds to the "acquisition control unit", the priority setting block 84 corresponds to the "priority setting unit", and the similarity calculation block 85 corresponds to the "similarity calculation unit." The news distribution site NDS corresponds to the "information source", S125 corresponds to the "attribute setting step", S128 corresponds to the "conversation execution step", and S161 corresponds to the "acquisition control step."

OTHER EMBODIMENTS

Although one embodiment has been illustrated above, the technical idea of the present disclosure can be realized as a variety of embodiments and a combination thereof.

The dialog device according to the above embodiment gradually changes the topic while holding the linkage between the topics by performing control of appropriately changing the thread specified as the fixed thread, to thereby enable expansion of the conversation with the user. However, the dialog device can also gradually change the topic while holding the linkage between the topics by performing control of appropriately changing the maintained attribute information without defining a thread with respect to the content information.

The dialog device according to the above embodiment inserts a linking sentence into the opening of the conversational sentence at the time of changing the content information for use in generation of the conversational sentence. Such a linking sentence is not restricted to the example of the above embodiment, but can be changed as appropriate, so long as being words capable of naturally linking the conversations. Alternatively, the linking sentence may not be inserted.

The dialog device according to the above embodiment calculates the similarity of two pieces of content information, and eliminates the acquired content information from the candidates for use in generation of the conversational sentence when the similarity exceeds the threshold. However, such screening processing on the content information based on the similarity may be omitted. The determination based on the similarity may be made only when the news distribution site NDS being the original source of the content information is changed.

The conversation starting condition (cf. FIG. 5, S105) in the above-described embodiment can be changed as appropriate. For example, the dialog device can start a chat with the user, with the following as a trigger: inputting by the driver who has become aware of the careless state into a dialog start switch provided around the driver's seat; speaking of words such as "Let's have a chat" by the driver; utterance of a specific keyword by the passenger, or some other event.

In the above-described embodiment, the higher the user's interest, the more the number of fixed thread is increased. However, the number of threads specified as the fixed threads can be constant regardless of whether the user's interest is high. The thread specified to be the fixed thread may be changed every time the content information is acquired regardless of the user's utterance.

In the above-described embodiment, immediately before the dialog device 100 starts a series of conversation described below, the speaker 32 may output a notification sound for notifying the user of the conversation start. The notification sound can turn the user's awareness to the sound of the conversation. As a result, the user hardly misses a beginning part of the conversation started by the dialog device 100.

In the above-described embodiment, the careless state or the drowsy state are estimated from the state of the driver's face. However, for example, when movements of the driver's hands and body are detectable by the in-vehicle imaging unit, the careless state or the drowsy state may be estimated based on such an action of the driver rubbing his or her eyes or face with the hand or such an action of the driver frequently correcting his or her seated position and posture.

In the above-described embodiment, the detailed description has been given of the case where the dialog device is having a non-task-oriented conversation with the aim at intersection itself. However, the dialog device can have not only such a conversation as the chat described above, but also a task-oriented conversation, such as replying to a question asked by the passenger or making a reservation for a shop specified by the passenger. Further, during a non-task-oriented conversation, the task-oriented conversation can be inserted temporarily.

In the above-described embodiment, each function in relation to execution of the conversation, provided by the processor 60a of the control circuit 60, may be realized by a dedicated integrated circuit, for example. Alternatively, a plurality of processors may be cooperated to execute each processing in relation to execution of the conversation. Each of the functions may be provided by hardware or software different from the above, or a combination of these. Similarly, the driving burden determination and the arousal determination provided by the processor 50a of the state information processing circuit 50 can also be provided by hardware or software different from the above, or a combination of these. Further, the storage medium for storing a program to be executed by each of the processors 50a, 60a is not restricted to the flash memory. A variety of non-transitive substantive storage medium can be employed as a configuration to store the program.

The technical idea of the present disclosure is applicable to communication equipment such as a smart phone and a tablet terminal and a dialog control program to be installed into a server outside the vehicle. For example, the dialog control program is stored in a storage medium of a communication terminal, which is brought into the vehicle, as an application executable by the processor. The communication terminal can interact with the driver in accordance with the dialog control program, and can hold the driver's arousal state through the dialog.

Figure 9:
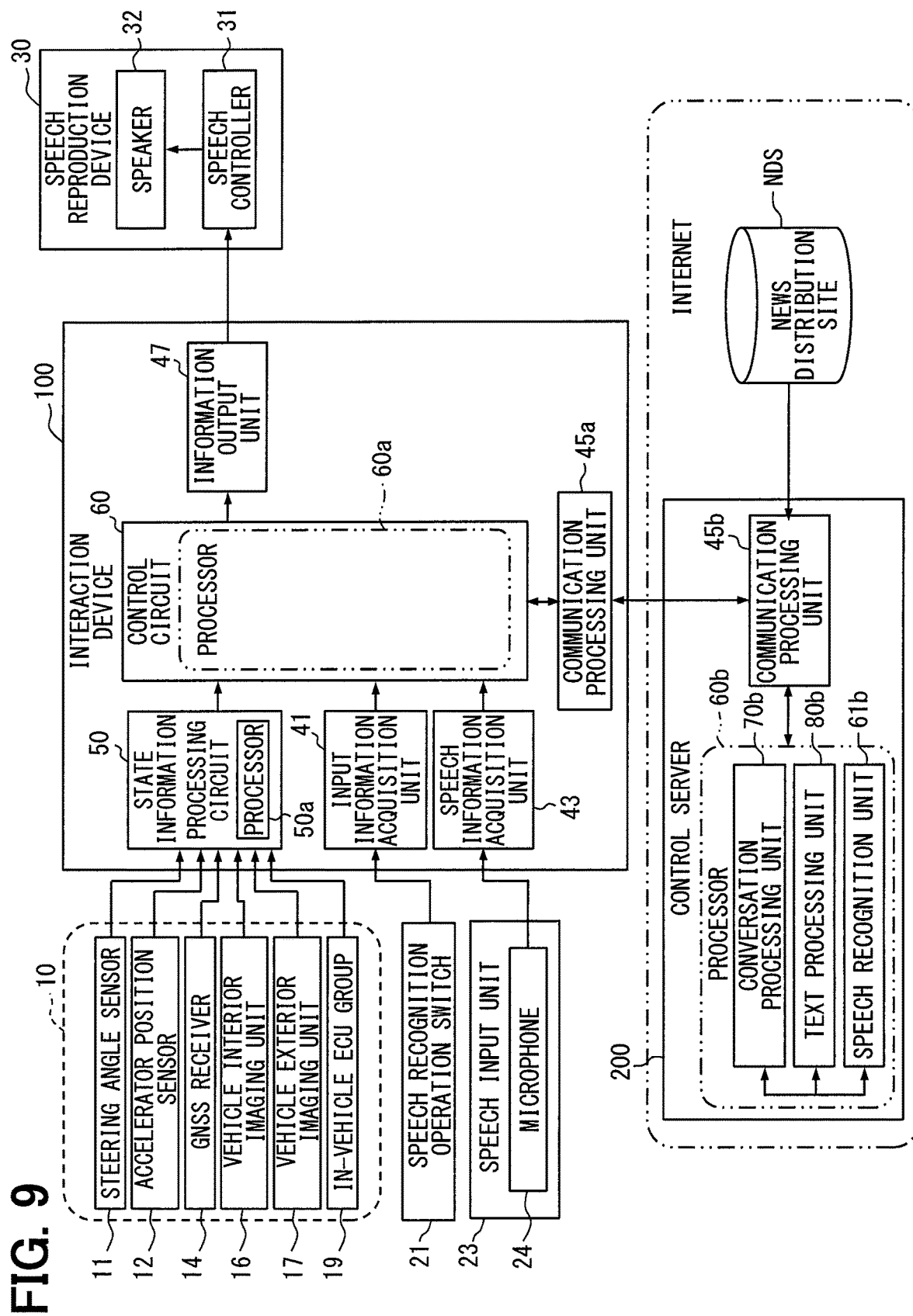
FIG. 9 is a block diagram showing an overall configuration of a dialog system according to the modified example.

When the dialog control program is stored in the storage medium of the server, the server can acquire state information of the vehicle and the driver through the Internet. Further, the server can transmit conversational sentences, generated based on the acquired state information, to the speech reproduction device of the vehicle and reproduce the generated conversational sentences from the speaker. FIG. 9 is a block diagram showing an overall configuration of a dialog system according to this modified example. Since a basic configuration of the modified example is similar to that of the above embodiment, description of the common configuration is omitted by referring to the preceding description, and different points will be mainly described. Note that the same symbol as that in the above-described embodiment shows the same configuration.

In the above-described embodiment, by execution of a predetermined program by the processor 60a of the dialog device 100, the dialog device 100 constructs the speech recognizer 61, the conversation processing unit 70, and the text processing unit 80 as the functional blocks. In contrast, in the modified example, by execution of a predetermined program by a processor 60b of a control server 200, the control server 200 constructs a speech recognizer 61b, a conversation processing unit 70b, and a text processing unit 80b as functional blocks. That is, the speech recognizer 61b, the conversation processing unit 70b, and the text processing unit 80b provided in the remote control server 200 are configurations (clouds) that substitute for the functions of the speech recognizer 61, the conversation processing unit 70, and the text processing unit 80 of the dialog device 100 in the above-described embodiment. Accordingly, a communication processing unit 45b of the control server 200 acquires information required for processing of the speech recognizer 61b, the conversation processing unit 70b, and the text processing unit 80b via the communication network such as the Internet, and transmits the generated conversational sentence to the communication processing unit 45a of the dialog device 100, to reproduce the conversational sentence from the speech reproduction device 30. Specifically, while acquiring the content information from the news distribution site NDS and the like, the communication processing unit 45b of the control server 200 acquires from the dialog device 100 a variety of pieces of information such as the state information of the vehicle and the driver, having been inputted into the control unit 60 from the state information processing circuit 50, the input information acquisition unit 41, and the speech information acquisition unit 43 of the dialog device 100 in the above-described embodiment. The conversational sentence generated based on the information as thus acquired is transmitted from the communication processing unit 45b of the control server 200 to the communication processing unit 45a of the dialog device 100 via the communication network. In FIG. 9, the configuration has been illustrated where the control server 200 is provided with the speech recognizer 61b, the text processing unit 80b, and the conversation processing unit 70b. However, the control server may be provided with some function of the speech recognizer, the text processing unit, and the conversation processing unit, and the dialog device may be provided with the other function. For example, the dialog device may be provided with the speech recognizer, and the control server may be provided with the text processing unit and the conversation processing unit.

As above, even when the dialog control program is installed in the server, a conversation between the driver as the user and the system can be achieved. Even the server-type dialog system can hold the driver's arousal state.

As above, the dialog method performed by each of the communication equipment, the server, and the like which execute the dialog control program can be substantially the same as the dialog method performed by the dialog device. The technical idea of the present disclosure is applicable not only to the dialog device mounted in the vehicle, but also to devices with the function of having a conversation with the user, such as an automated teller machine (ATM), a tool, a reception robot, and a care robot.

The technical idea of the present disclosure is also applicable to a dialog device mounted in a vehicle that performs automated driving (an autonomous traveling vehicle). For example, there is assumed automatic driving on an automated level where "a driving system automated in a specific driving mode performs an operation to drive a vehicle under a condition that the driver appropriately meets a driving operation switching request from the driving system." In such an automatically driving vehicle, the driver (operator) needs to be held in a standby state for backup of the driving operation. It is thus presumed that the driver in the standby state tends to enter the careless state or the drowsy state. Accordingly, the dialog device as thus described is preferable also for the configuration to hold the arousal of the driver who is in the standby state as the backup of the automatic driving system.

Although the variety of embodiments and modified examples according to the present disclosure have been illustrated above, an embodiment obtained by appropriately combining the respective technical elements of these embodiments and modified examples is also an embodiment of the present disclosure.

What is claimed is:

1. A dialog device that executes a conversation with a user using a conversational sentence generated from content information, the content information being at least one of news, a newspaper article, a blog article, traffic information, and regional information, the dialog device comprising:
   an information acquisition unit that acquires the content information from at least one or more news distribution sites on an Internet;
   a conversation execution unit that changes the content information used in generation of the conversational sentence, sets the content information used in the generation of the conversational sentence as specific content information, and continues the conversation with the user;
   an attribute setting unit that sets a plurality of attribute information pieces with respect to the specific content information used in the generation of the conversational sentence in the conversation execution unit, the plurality of attribute information pieces being words in the content information; and an acquisition control unit that controls the information acquisition unit to acquire other content information having at least a number of same attribute information pieces as the specific content information, the other content information used to generate a next conversational sentence after the conversational sentence with the specific content information, wherein:

the attribute setting unit defines a plurality of threads with respect to the specific content information, each of the plurality of threads having one of the plurality of attribute information pieces, and each of the plurality of threads being one of a keyword, a broad category classification, a category detail, a date, a place, and a news distribution site;

the plurality of threads including (i) one or more fixed threads, or (ii) the one or more fixed threads and one or more transit threads, the one or more fixed threads being threads where the attribute information piece in each of the one or more fixed threads is fixed and does not change between the conversational sentence and the next conversational sentence, and the one or more transit threads being threads where the attribute information piece in each of the one or more transit threads is not fixed and changes between the conversational sentence and the next conversational sentence;

in response to the acquisition control unit controlling the information acquisition unit to acquire the other content information used to generate the next conversational sentence, the acquisition control unit changes at least one of the fixed threads in the plurality of threads to a transit thread;

another fixed thread in the plurality of threads in both the conversational sentence and the next conversational sentence has a same attribute information piece;

a number of the fixed threads in the plurality of threads is changeable; and wherein the dialog device further comprises a priority setting unit that sets a priority order of the fixed threads, a fixed thread with a lower priority order among the fixed threads being changed by the acquisition control unit to the transit thread; and the acquisition control unit specifies one of the plurality of threads having a higher priority order, as set by the priority setting unit, as the fixed thread.

2. The dialog device according to claim 1 further comprising:

an utterance acquisition unit that acquires a content of utterance of the user, wherein:

the priority setting unit adjusts the priority order of the plurality of threads based on a record of the utterance of the user acquired in the utterance acquisition unit.

3. The dialog device according to claim 1, wherein:

in response to the conversation execution unit changing the content information used in the generation of the conversational sentence, the conversation execution unit inserts a linking sentence into an opening of the conversational sentence generated from the content information after changing the content information, the linking sentence indicating the transit thread among the plurality of threads.

4. The dialog device according to claim 1, wherein:

in response to the conversation execution unit changing the content information used in the generation of the conversational sentence, the conversation execution unit inserts a linking sentence indicative of the fixed thread into an opening of the conversational sentence that is generated from the content information after changing the content information.

5. The dialog device according to claim 1 further comprising:

a similarity calculation unit that calculates a similarity between the specific content information and the other content information, wherein:

in response to the similarity being higher than a predetermined threshold, the acquisition control unit eliminates the other content information having the similarity that is used in the generation of the next conversational sentence in the conversation execution unit.

6. A dialog method for acquiring content information from an information source via an information acquisition unit and for executing a conversation with a user using a conversational sentence generated from the content information, the content information being at least one of news, a newspaper article, a blog article, traffic information, and regional information, the information source being at least one or more news distribution sites on an Internet, and the dialog method comprising: as steps to be executed by at least one processor, a conversation execution step of changing the content information used in generation of the conversational sentence, setting the content information used in the generation of the conversational sentence as specific content information, and continuing the conversation with the user;

an attribute setting step of setting a plurality of attribute information pieces with respect to the specific content information used in the generation of the conversational sentence in the conversation execution step, the plurality of attribute information pieces being words in the content information; and an acquisition control step of controlling the information acquisition unit to acquire other content information having at least a number of same attribute information pieces as the specific content information, the other content information used to generate a next conversational sentence after the conversational sentence with the specific content information, wherein:

the attribute setting step defines a plurality of threads with respect to the specific content information, each of the plurality of threads having one of the plurality of attribute information pieces, and each of the plurality of threads being one of a keyword, a broad category classification, a category detail, a date, a place, and a news distribution site;

the plurality of threads includes (i) one or more fixed threads, or (ii) the one or more fixed threads and one or more transit threads, the one or more fixed threads being threads where the attribute information piece in each of the one or more fixed threads is fixed and does not change between the conversational sentence and the next conversational sentence, and the one or more transit threads being threads where the attribute information piece in each of the one or more transit threads is not fixed and changes between the conversational sentence and the next conversational sentence;

in response to the acquisition control step controlling the information acquisition unit to acquire the other content information used to generate the next conversational sentence, the acquisition control step changes at least one of the fixed threads in the plurality of threads to a transit thread;

another fixed thread in the plurality of threads in both the conversational sentence and the next conversational sentence has a same attribute information piece;
a number of the fixed threads in the plurality of threads is changeable; and wherein
the dialog method further comprises a priority setting step that sets a priority order of the fixed threads, a fixed thread with a lower priority order among the fixed threads being changed in the acquisition control step to the transit thread; and
the acquisition control step specifies one of the plurality of threads having a higher priority order, as set in the priority setting step, as the fixed thread.

7. The dialog method according to claim 6, wherein:
the conversation execution step, the attribute setting step, the acquisition control step, and the priority setting step are performed by a processor in a remote server connectable with a speech reproduction device for outputting the conversational sentence via a communication network.

8. A dialog device comprising:
a communication processing unit that receives a conversational sentence via a communication network, the conversational sentence generated by a remote server having a processor that executes the conversation execution step, the attribute setting step, the acquisition control step, and the priority setting step according to claim 6; and
an information output unit that outputs the conversational sentence received by the communication processing unit to a speech reproduction device.

9. A dialog system comprising:
a remote server having a processor that executes the conversation execution step, the attribute setting step, the acquisition control step, and the priority setting step according to claim 6; and
a dialog device including
a communication processing unit that receives the conversational sentence generated by the remote server via a communication network, and
an information output unit that outputs the conversational sentence received by the communication processing unit to a speech reproduction device.

10. A non-transitory tangible computer readable medium comprising instructions being executed by a computer, the instructions including a computer-implemented method for executing the conversation execution step, the attribute setting step, the acquisition control step, and the priority setting step according to claim 6 in the at least one processor.

11. The non-transitory tangible computer readable medium according to claim 10, wherein:
the computer-implemented method is an application executable in a communication terminal.

12. The dialog device according to claim 1, wherein:
in response to the user showing an interest in the conversation, the number of fixed threads is increased; and
in response to the user showing little interest in the conversation, the number of fixed threads is decreased.

13. The dialog method according to claim 6, wherein:
in response to the user showing an interest in the conversation, the number of fixed threads is increased; and
in response to the user showing little interest in the conversation, the number of fixed threads is decreased.

14. A dialog device that executes a conversation with a user by using a conversational sentence generated from current content information and a next conversational sentence generated from other content information, the current content information and the other content information being at least one of news, a newspaper article, a blog article, traffic information, and regional information, and the dialog device comprising:
a communication processing unit including an antenna for mobile communication and configured to acquire the current content information and the other content information from at least one or more news distribution sites on an Internet; and
a microcomputer configured
to define a plurality of threads for the current content information and the other content information, each of the plurality of threads being one of a keyword, a broad category classification, a category detail, a date, a place, and a news distribution site,
to set attribute information for the plurality of threads for the current content information to generate the conversational sentence, the attribute information being words in the current content information and the other content information,
to fix the attribute information associated with at least one of the plurality of threads for the current content information to specify at least one fixed thread, the fixed attribute information of the at least one fixed thread configured not to change between the current content information for generating the conversational sentence and the other content for generating the next conversational sentence,
to set the attribute information for the plurality of threads for the other content information to generate the next conversational sentence, and
to change the current content information used to generate the conversational sentence to the other content information used to generate the next conversational sentence to continue the conversation with the user, wherein in response to acquiring the other content information for generating the next conversational sentence, the microcomputer is further configured to generate the next conversational sentence with the fixed attribute information of the at least one fixed thread of the current content information and the set attribute information of the plurality of threads for the other content information and to output the next conversational sentence, and wherein
the microcomputer is further configured to set a priority order of the at least one fixed thread in the plurality of threads, a fixed thread with a lower priority order among the at least one fixed thread being changed by the microcomputer to a transit thread, the transit thread being such that the attribute information is not fixed and changes between the current conversational sentence and the next conversation sentence, and wherein
the microcomputer is further configured to specify one of the plurality of threads having a higher priority order as the at least one fixed thread.

15. The dialog device according to claim 2, wherein:
in response to a word extracted from the content of utterance of the user being related to the attribute information piece, the priority setting unit lowers the priority order of one of the fixed threads with the attribute information piece related to the extracted word.

16. The dialog device according to claim 2, wherein:
in response to the user indicating an interest in the conversation based on the specific content information, the priority setting unit adjusts one of the plurality of threads by raising the priority order of the one of the plurality of threads.

17. The dialog device according to claim 2, wherein:
in response to the user indicating little interest in the conversation, the priority setting unit lowers the priority of one of the fixed threads.

18. The dialog device according to claim 16, further comprising: a user interest calculation unit that calculates a degree of interest in the conversation by extracting words from the content of utterance of utterance of the user and comparing the extracted words with words in a dictionary to calculate a value of the extracted words, each word in the dictionary having a positive value or a negative value, wherein the degree of interest is based on the value of the extracted words.

19. The dialog device according to claim 16, further comprising:
a camera the captures an image of the user; and
a user interest calculation unit that calculates a degree of interest in the conversation based on a user's expression in the image.

* * * * *